(12) United States Patent
Hong et al.

(10) Patent No.: US 12,412,398 B2
(45) Date of Patent: Sep. 9, 2025

(54) VIDEO-LEARNING MONITORING DEVICE AND METHOD THEREFOR

(71) Applicant: Won Pyo Hong, Seongnam-si (KR)

(72) Inventors: Won Pyo Hong, Seongnam-si (KR); Jin Pyo Hong, Seongnam-si (KR); Young Bin Hong, Seongnam-si (KR)

(73) Assignee: Won Pyo Hong, Seongnam-si (KR)

( * ) Notice: Subject to any disclaimer, the term of this patent is extended or adjusted under 35 U.S.C. 154(b) by 0 days.

(21) Appl. No.: 18/721,871

(22) PCT Filed: Jan. 3, 2023

(86) PCT No.: PCT/KR2023/000111
§ 371 (c)(1),
(2) Date: Jun. 20, 2024

(87) PCT Pub. No.: WO2023/128738
PCT Pub. Date: Jul. 6, 2023

(65) Prior Publication Data
US 2024/0420476 A1    Dec. 19, 2024

(30) Foreign Application Priority Data
Jan. 3, 2022    (KR) ........................ 10-2022-0000058

(51) Int. Cl.
*G06V 20/52*    (2022.01)
*G06V 40/20*    (2022.01)

(52) U.S. Cl.
CPC .............. *G06V 20/52* (2022.01); *G06V 40/20* (2022.01)

(58) Field of Classification Search
CPC ........ G06V 20/52; G06V 40/20; G06Q 50/20; G06Q 30/0244; G06Q 30/0251; G06Q 30/0282; G06Q 50/10; G06Q 50/26; G09B 5/08; H04N 7/18; H04N 21/4668; H04N 21/812; G06N 3/08; G06T 3/40; G06T 7/11; G08B 3/10

See application file for complete search history.

(56) References Cited

U.S. PATENT DOCUMENTS

| | | | | |
|---|---|---|---|---|
| 5,944,530 A | * | 8/1999 | Ho ........................... | G09B 5/00 434/362 |
| 2002/0106615 A1 | * | 8/2002 | Murray .................... | G09B 5/00 434/156 |
| 2004/0191744 A1 | * | 9/2004 | Guirguis .................. | G09B 7/02 434/322 |

(Continued)

FOREIGN PATENT DOCUMENTS

| | | |
|---|---|---|
| JP | 2021-018316 A | 2/2021 |
| KR | 10-2009-0092642 A | 9/2009 |

(Continued)

OTHER PUBLICATIONS

International Search Report for PCT/KR2023/000111 mailed Apr. 7, 2023 from Korean Intellectual Property Office.

*Primary Examiner* — Anner Holder
(74) *Attorney, Agent, or Firm* — Revolution IP, PLLC

(57) ABSTRACT

A video-learning monitoring device (100) includes: a communication unit (170) for receiving studying video of a student captured by means of a user terminal (200); and a score calculation unit (140) for calculating self-directed learning scores of the student on the basis of the studying video received by means of the communication unit (170).

4 Claims, 6 Drawing Sheets

(56) References Cited

U.S. PATENT DOCUMENTS

| | | | | |
|---|---|---|---|---|
| 2004/0214152 A1* | 10/2004 | Hoyashita | ............... | G09B 7/00 |
| | | | | 434/350 |
| 2010/0216107 A1* | 8/2010 | Hines | ..................... | G09B 7/02 |
| | | | | 434/362 |
| 2012/0329027 A1* | 12/2012 | Lewolt | .................... | G09B 7/00 |
| | | | | 434/322 |
| 2013/0004930 A1* | 1/2013 | Sorenson | ................ | G09B 7/02 |
| | | | | 434/350 |
| 2013/0226674 A1* | 8/2013 | Field | ..................... | G06Q 50/20 |
| | | | | 705/7.38 |
| 2015/0279426 A1* | 10/2015 | Maurer | .................. | G11B 27/28 |
| | | | | 386/241 |
| 2017/0294133 A1* | 10/2017 | Jääskeläinen | ............ | G09B 5/14 |
| 2020/0193859 A1* | 6/2020 | Holstein | ................ | G09B 7/00 |
| 2021/0150924 A1* | 5/2021 | Yang | ...................... | G09B 5/125 |
| 2021/0201690 A1* | 7/2021 | Keat | ........................ | G09B 7/00 |
| 2021/0326585 A1* | 10/2021 | Tu | ....................... | G06V 40/172 |

FOREIGN PATENT DOCUMENTS

| | | | |
|---|---|---|---|
| KR | 10-2011-0058270 A | | 6/2011 |
| KR | 10-2020-0056502 A | | 5/2020 |
| KR | 10-2021-0012713 A | | 2/2021 |
| KR | 102210687 B1 | * | 2/2021 |
| KR | 20210098113 A | * | 8/2021 |
| WO | WO-2009108018 A2 | * | 9/2009 ............... G09B 5/00 |

* cited by examiner (a)

(b)                          (c)

VIDEO-LEARNING MONITORING DEVICE AND METHOD THEREFOR

TECHNICAL FIELD

The present invention relates to a video-learning monitoring device and method, and more specifically, to a video-learning monitoring device and method that enable students to strengthen their self-directed learning capabilities, including good learning posture, and to develop good study habits so that they can focus more during study time.

BACKGROUND ART

Research shows that the impact of academic performance supremacy and the craze for college entrance exams extends even to the lower grades of elementary school, and many parents have no choice but to rely heavily on private education, such as prior learning through private institutes or tutors, to ensure that their children do not fall behind in the entrance exam competition.

The excessive private education has a problem of causing students to lose self-directed learning ability and interest in learning, resulting in a significant decline in academic achievement in the long term. In particular, research data comparing the improvement in grades between private education and self-directed learning shows that private education shows an achievement result of 1.5%, while self-directed learning shows an achievement result of 4.6%, and therefore the importance of self-directed learning is increasingly being emphasized at the national level, such as by promoting curriculums that strengthen self-directed learning, and in advanced educational countries such as Europe, the United States, etc., educational methods for self-directed learning have been researched and developed for a long time.

However, recently, students have been exposed to mobile environments such as smartphones and the like for considerable amounts of time, and as a result, their self-directed learning abilities have tended to gradually decline. Although students sit at their desks for the purpose of studying, they waste much time engaging in activities unrelated to self-directed learning, such as using their mobile phones at their desks, using social media with friends, watching entertainment video content, and the like.

Therefore, social demand for new types of learning monitoring devices, methods, and systems that utilize smartphones, which have now become an indispensable element in students' lives, to help students to strengthen their self-directed learning capabilities and develop good study habits so that they can focus more during study time is increasing in the art, especially in the education industry.

DISCLOSURE

Technical Problem

The present invention is devised to solve the above problems and is directed to providing a video-learning monitoring device and method that are capable of enabling students to improve their self-directed learning capabilities through video-learning monitoring and evaluation.

The present invention is also directed to providing a video-learning monitoring device and method that are capable of enabling students to improve their continuous learning attitudes and academic abilities by utilizing self-directed learning scores calculated based on studying videos of the students.

The present invention is also directed to providing a video-learning monitoring device and method that are capable of helping students develop study habits and improving self-directed learning abilities by providing the students with relatively low self-directed learning abilities with online learning guidance and customized online/offline linked guidance services.

The present invention is also directed to providing a video-learning monitoring device and method that are capable of increasing students' interest in an online self-directed learning management system by providing predetermined rewards to the students with excellent evaluation results from video learning monitoring.

Objects according to the technical spirit of the present invention are not limited to the above-described object and other objects that are not described may be clearly understood by those skilled in the art from the following descriptions.

Technical Solution

A video-learning monitoring device according to an embodiment of the present invention to solve the above objects includes: a communication unit configured to receive a studying video of a student that is captured by a user terminal; and a score calculation unit configured to calculate a self-directed learning score of the student on the basis of the studying video received by the communication unit.

In addition, the video-learning monitoring device may further include an evaluation unit including an environmental evaluation unit that evaluates a study environment of the student and an attitude evaluation unit that evaluates a studying attitude of the student.

In addition, the score calculation unit may be further configured to calculate the self-directed learning score using at least one of a result of the evaluation of the environmental evaluation unit and a result of the evaluation of the attitude evaluation unit.

In addition, the communication unit may be further configured to transmit the calculated self-directed learning score to at least one of a parent terminal and the user terminal.

In addition, a video-learning monitoring system according to another embodiment of the present invention to solve the above objects includes: the above-described video-learning monitoring device; and a user terminal communicatively coupled to the video-learning monitoring device.

In addition, a video-learning monitoring method according to still another embodiment of the present invention to solve the above objects includes: receiving a studying video of a student that is captured by a user terminal; and calculating a self-directed learning score of the student on the basis of the received studying video.

In addition, the video-learning monitoring method may further include: evaluating a study environment of the student; and evaluating a studying attitude of the student.

In addition, the calculating of the self-directed learning score of the student may include calculating the self-directed learning score using at least one of a result of the evaluation of the study environment and a result of the evaluation of the studying attitude.

In addition, the video-learning monitoring method may further include transmitting the calculated self-directed learning score to at least one of a parent terminal and the user terminal.

In addition, a computer program according to yet another embodiment of the present invention to solve the above objects interworks with a computer, which is hardware, and is stored in a computer-readable recording medium to perform the above-described video-learning monitoring method.

Advantageous Effects

According to a video-learning monitoring device and method according to an embodiment of the present invention, it is possible to improve self-directed learning capabilities of students' through video-learning monitoring and evaluation.

Further, according to a video-learning monitoring device and method according to an embodiment of the present invention, it is possible to improve continuous learning attitudes and academic abilities of students by utilizing self-directed learning scores calculated based on studying videos of the students.

Further, according to a video-learning monitoring device and method according to an embodiment of the present invention, it is possible to help students develop study habits and to improve self-directed learning abilities by providing the students with relatively low self-directed learning abilities with online learning guidance and customized online/offline linked guidance services.

Further, according to a video-learning monitoring device and method according to an embodiment of the present invention, it is possible to increase students' interest in an online self-directed learning management system by providing predetermined rewards to the students with excellent evaluation results from video learning monitoring.

DESCRIPTION OF DRAWINGS

In order to more fully understand the accompanying drawings cited in the detailed description of the present invention, a brief description of each drawing is provided.

MODES OF THE INVENTION

Figure 1A:
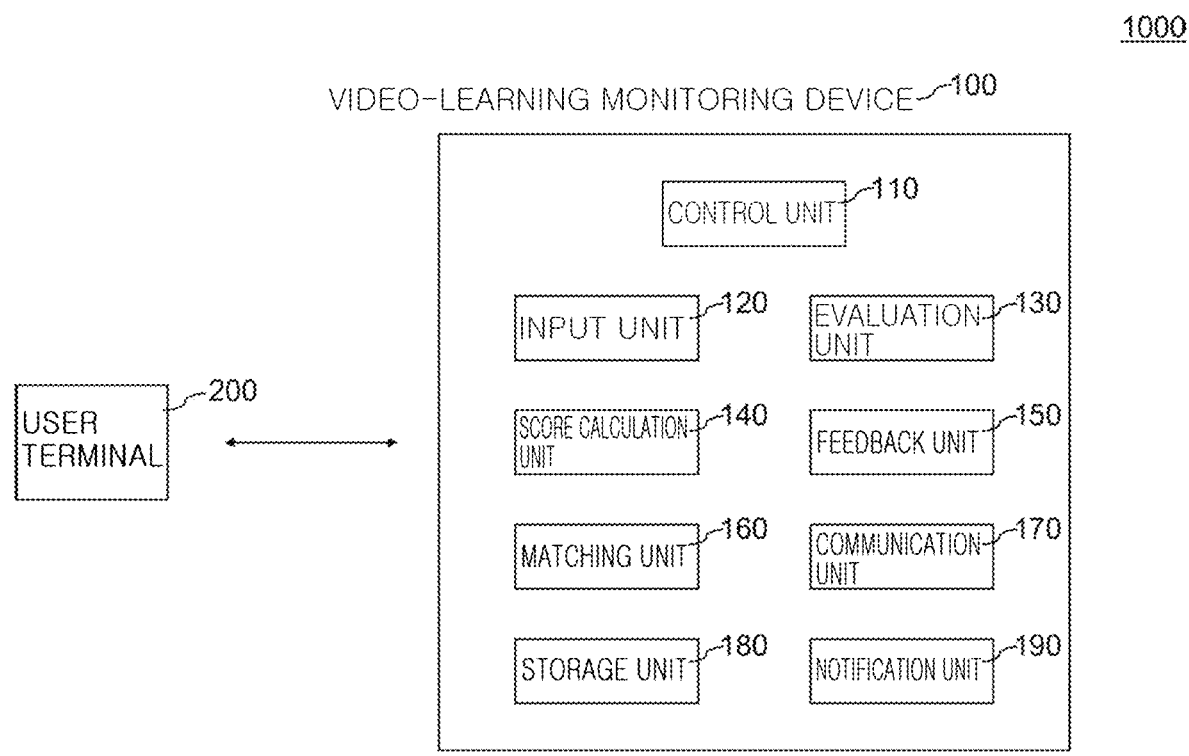
FIGS. 1A and 1B are schematic block diagrams of a video-learning monitoring system (1000) according to an embodiment of the present invention.

Hereinafter, embodiments of the present invention will be described with reference to the accompanying drawings. When reference numerals are assigned to components of each drawing, it should be noted that the same components are given the same reference numerals whenever possible even when the same components are illustrated in different drawings. Further, in the description of the present invention, when it is determined that detailed description of related well-known configurations or functions unnecessarily obscures the gist of the present invention, the detailed description thereof will be omitted. Further, the embodiments of the present invention will be described below, but the technical idea of the present invention is not restricted or limited thereto and may be modified and embodied in various ways by those skilled in the art.

In addition, throughout this specification, when a part is referred to as being "connected" to another part, it includes "directly connected" and "indirectly connected" via an intervening part. Further, when a certain part "includes" a certain component, this does not exclude other components from being included unless described otherwise, and other components may in fact be included. Further, in describing components of the present invention, terminologies such as "first," "second," "A," "B," "(a)," and "(b)" may be used. These terms are used to distinguish a component from another component but a nature, an order, or a sequence of the components is not limited by the terminology.

Figure 1B:
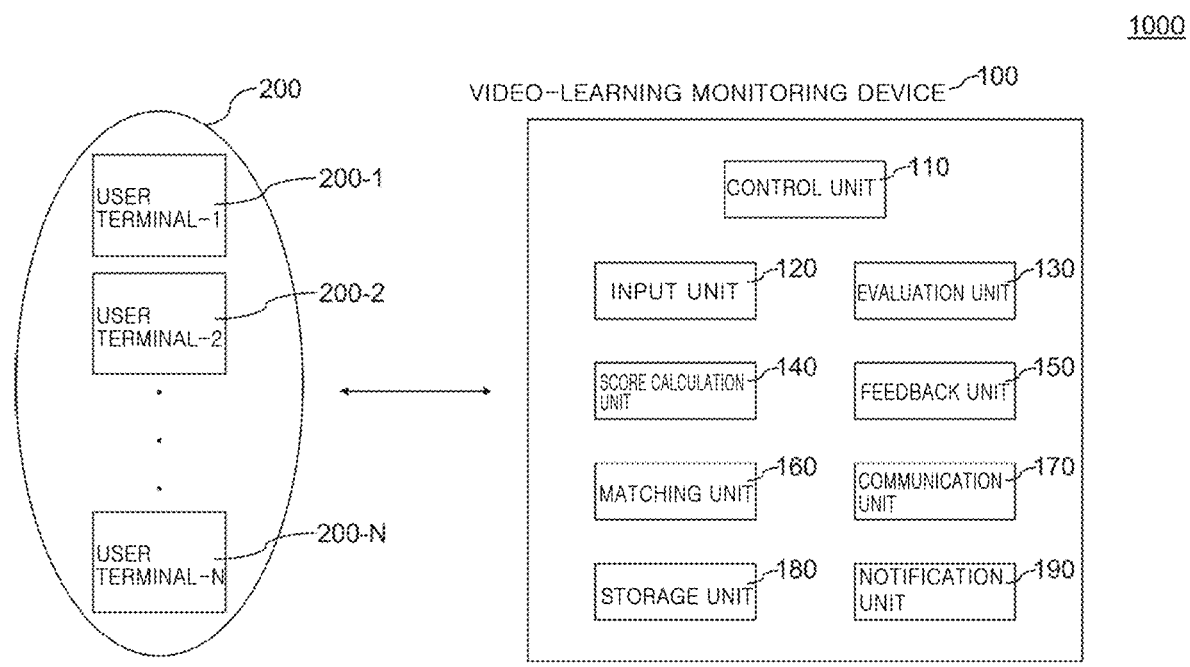
Figure 1C:
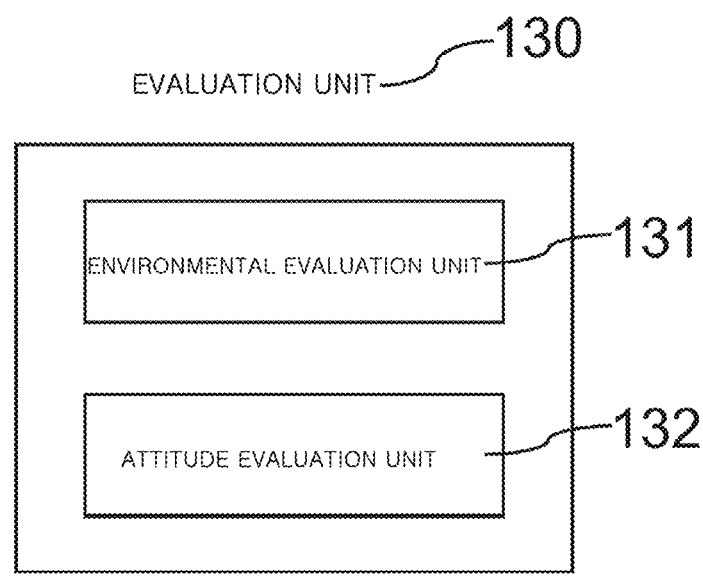
FIG. 1C is a detailed block diagram of an evaluation unit (130).

FIGS. 1A and 1B are schematic block diagrams of a video-learning monitoring system 1000 according to an embodiment of the present invention, and FIG. 1C is a detailed block diagram of an evaluation unit 130.

As illustrated in FIG. 1A, the video-learning monitoring system 1000 according to the embodiment of the present invention may include a video-learning monitoring device 100 and a user terminal 200.

For reference, a service for improving online self-directed learning capabilities may be installed on the user terminal 200 in the form of an application (which may also be referred to as an "app" or the like) and provided to users, including students. In this specification below, an application that provides a self-directed learning service to users will be referred to as a "video-learning monitoring application" for convenience.

The video-learning monitoring device 100 according to the embodiment of the present invention is a device that performs overall operation and management of a video-learning monitoring application, and may be implemented as, for example, an application server. As illustrated in FIG. 1A, the video-learning monitoring device 100 according to the embodiment of the present invention may include a control unit 110, an input unit 120, the evaluation unit 130, a score calculation unit 140, a feedback unit 150, a matching unit 160, a communication unit 170, a storage unit 180, and a notification unit 190.

For reference, the components 110, 120, 130, 140, 150, 160, 170, 180, and 190 of the video-learning monitoring device 100 illustrated in FIG. 1A are merely exemplary components for describing the operation, function, etc. of the video-learning monitoring device 100 according to the embodiment of the present invention. Therefore, it will be clear that the video-learning monitoring device 100 according to the embodiment of the present invention may further include components (e.g., a power supply unit, a display unit, an output unit, etc.) other than the illustrated components 110, 120, 130, 140, 150, 160, 170, 180, and 190.

Further, the video-learning monitoring device 100 according to the embodiment of the present invention corresponds to a device based on its own computer program produced and operated by an individual or a private company, and may be referred to by any of various terms such as "device," "equipment," "server," "platform," etc. according to various expressions in the related technical field.

For example, the video-learning monitoring device 100 according to the embodiment of the present invention may receive in real time a video of a student that is captured by the user terminal 200 and calculate a self-directed learning score of the student on the basis of the video of the student. To this end, the video-learning monitoring device 100 may be implemented as an application type or a widget type. Here, the widget may include a mini application that allows a user to directly use content or functions without going through an application. Therefore, in this specification below, the term "application" may be interpreted as a comprehensive concept including a widget, and the user may download a video-learning monitoring application operated and managed by the video-learning monitoring device 100 according to the present invention from an online market or the like, install the video-learning monitoring application on the user terminal 200, and use it.

The user (e.g., a student or the like) of the user terminal 200 may download and install a video-learning monitoring application from an online market or the like. Here, an additional procedure may be involved for the user to sign up for an application service, and when the application service is operated for a fee, a payment procedure for the applicable fee (e.g., 10,000 KRW/month, 20,000 KRW/month, etc.) may be involved. To this end, additional communication with a payment server (not illustrated) may be further implemented.

The input unit 120 of the video-learning monitoring device 100 according to the embodiment of the present invention may provide an input interface that allows the user to input a study plan, for example, a study time, into the user terminal 200. The user terminal 200 may allow the user to input a study time (e.g., 10:00-11:00 PM) through the input unit 120, and the input study time may be stored for each user category in the storage unit 180 and used for evaluation by the evaluation unit 130 and for notification by the notification unit 190.

In this specification below, the study time is described as being represented as a study plan input by the user through the input unit 120. However, according to another embodiment of the present invention, interfaces that allow the user to make additional inputs, such as a study subject (e.g., mathematics), a study textbook (e.g., Standard Techniques of Mathematics), a study scope (e.g., pages 103 to 107), etc., may be further provided in addition to the study time.

For reference, although the study time input into the user terminal 200 through the input unit 120 (i) may be input individually every day, (ii) may be input all at once as a fixed time during a predetermined period (e.g., 10:00-11:00 PM daily from December $20^{th}$ to $31^{st}$ or the like), or (iii) may be input as a variable time depending on the day of the week, these input methods of inputting the study time are only examples for easy understanding of the present invention, and therefore, the present invention is not limited thereto. For the study time of the student input in this way, the video-learning monitoring device 100 according to the present invention may become a so-called study planner to register and manage the study time, and may utilize a daily score table, graph, etc. to check, for example, whether the self-directed learning score is gradually improving according to the target for each day, whether there is no significant improvement, whether the self-directed learning score is decreasing, or the like.

In addition, the input unit 120 of the video-learning monitoring device 100 according to the embodiment of the present invention may additionally construct an interface that allows the user to input a changed study time for a pre-input study time. For example, when the student registers a study time of 10:00-11:00 PM but inevitably has something else scheduled at the corresponding time, the student may execute the video-learning monitoring application to input a changed study time (e.g., 8:00-9:00 PM on the same day or 9:00-11:00 AM the next day, etc.) through the input unit 120. Here, the video-learning monitoring system 1000 may be implemented so that the change in study time is operated subject to confirmation from a parent terminal 300 (see FIG. 4).

Alternatively, the control unit 110 of the video-learning monitoring device 100 according to another embodiment of the present invention may be configured to suggest a customized study time to the user terminal 200 on the basis of user information stored in the storage unit 180 and/or on the basis of accumulated learning results of the user information. For example, the user terminal 200 may input the user information, such as a school start time, a school dismissal time, a private institute time, an after-school schedule, a weekend schedule, etc., of the student through the input unit 120, and the control unit 110 may suggest a customized study time to the user terminal 200 on the basis of the user information, evaluation results obtained by the evaluation unit 130, a self-directed learning score calculated by the score calculation unit 140, and the like. For example, the control unit 110 may statistically analyze times when the self-directed learning score is relatively high and suggest the analyzed study times to the user terminal 200 or the parent terminal 300 not only to improve the student's study efficiency but also to make the user or his/her parents more interested in studying.

Figure 2:
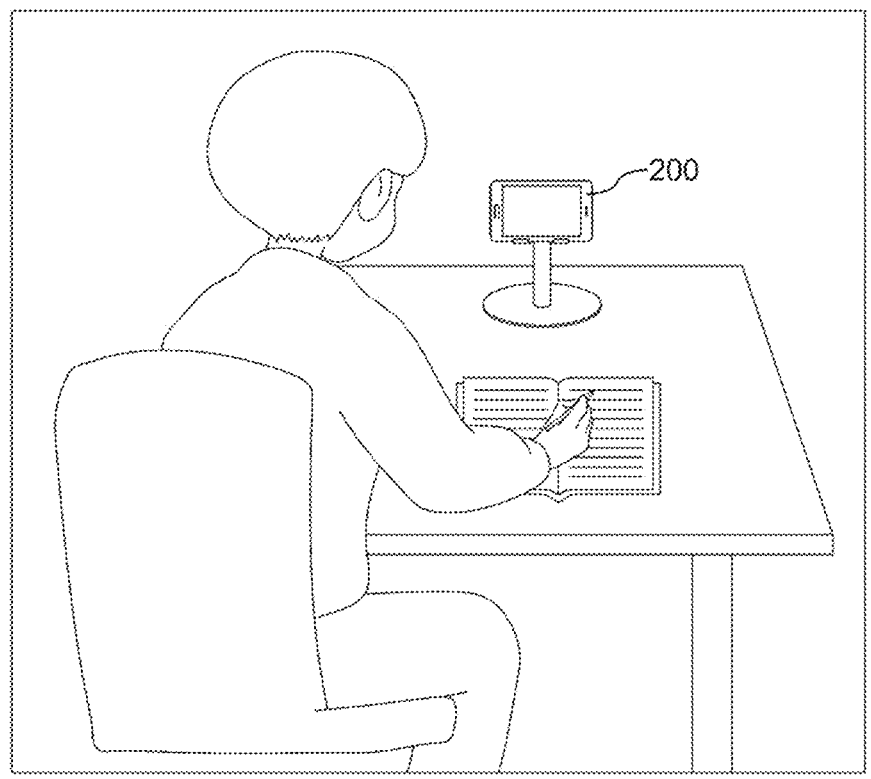
FIG. 2 shows an exemplary diagram (A) for describing a captured studying video of a student according to an embodiment of the present invention, and exemplary diagrams (B) and (C) for describing various interfaces through which studying videos of students are displayed on a video-learning monitoring device (100) according to an embodiment of the present invention.
Figure 2:
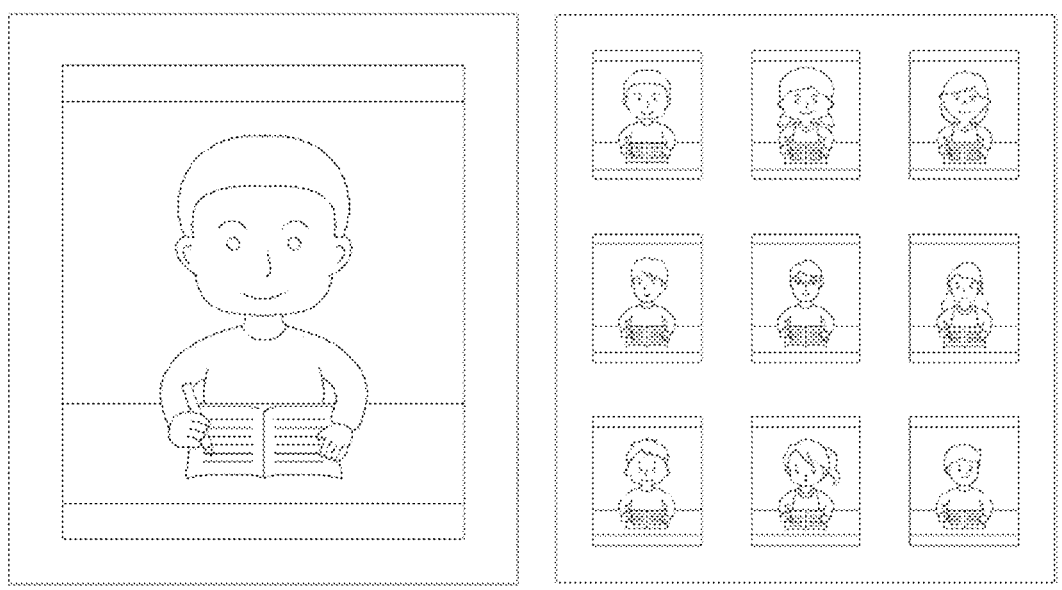

When the study time of the student is registered by the user terminal 200 and the video-learning monitoring application is executed on the user terminal 200, the studying video of the student that is captured by the user terminal 200 may be transmitted to the video-learning monitoring device 100 through the communication unit 170 in real time. For accurate and fair evaluation, in particular, for artificial intelligence (AI)-based video analysis, a method of capturing a studying video (e.g., angle, placement, etc.) may be demonstrated in advance on the user terminal 200 through the video-learning monitoring application. For example, as illustrated in FIG. 2A, the student may be guided to place the user terminal 200 horizontally on the front or side of the desk so that the student's upper body, including face, and the textbook placed on the desk are clearly photographed, and when it is determined that the received video does not meet predetermined requirements, the feedback unit 150 may request the user terminal 200 to relocate the user terminal 200, adjust an angle thereof, or the like through voice or text, and the adjustment request from the feedback unit 150 may continue until the photographing requirements are met.

Here, according to an additional embodiment of the present invention, the studying video of the student that is captured by the user terminal 200 may be transmitted not only to the video-learning monitoring device 100 but also to the parent terminal 300 in real time, the simultaneous transmission of the studying video to the parent terminal 300 may be subject to, for example, approval from a video-learning monitoring manager, and accordingly, the parents may easily check their child's learning attitude, situation, and the like even in a remote location without direct contact with the child. When the studying video of the student is also transmitted to the parent terminal 300, the notification unit 190 according to the embodiment of the present invention may provide a notification of the start of study to the parent terminal 300 before the study time, for example, about 10 minutes before the study time.

The evaluation unit 130 of the video-learning monitoring device 100 may be configured to evaluate a study environment and a studying attitude on the basis of the studying video of the student that is received from the user terminal 200 through the communication unit 170. To this end, as illustrated in FIG. 1C, the evaluation unit 130 may be composed of an environmental evaluation unit 131 and an attitude evaluation unit 132.

The environmental evaluation unit 131 may evaluate the study environment before the student starts studying, and the evaluation of the study environment may at least include evaluation of timely access. For example, when the student registers a study time as 10:00-11:00 PM, the environmental evaluation unit 131 may execute the video-learning monitoring application at or a few minutes before 10:00 PM to determine whether the user terminal 200 of the corresponding student has accessed the video-learning monitoring device 100. To this end, the video-learning monitoring device 100 according to the embodiment of the present invention may inform the user terminal 200 of remote access conditions to the video-learning monitoring system a predetermined time, for example, 10 minutes, before the registered study time, and the user terminal 200 may access the video-learning monitoring device 100 according to the informed remote access conditions, for example, using the video-learning monitoring application.

When the environmental evaluation unit 131 evaluates that the user terminal 200 has performed access in a timely manner, this evaluation may act as a positive factor when the self-directed learning score is calculated by the score calculation unit 140, whereas, when the environmental evaluation unit 131 evaluates that the user terminal 200 has not performed access in a timely manner, for example, when the user terminal 200 has accessed the system 20 minutes late, this evaluation may act as a negative factor when the self-directed learning score is calculated by the score calculation unit 140. In particular, when the user terminal 200 has not performed access at all during the registered study time, all the evaluation evaluated by the evaluation unit 130 and the score calculated by the score calculation unit 140 may be treated as 0, and the parent terminal 300 and/or the user terminal 200 may be immediately notified of this fact of non-access and the score of 0.

In addition to or as an alternative to evaluating timely access, the environmental evaluation unit 131 according to the embodiment of the present invention may evaluate whether the surrounding environment of the student is a suitable environment for studying on the basis of the studying video received in real time from the user terminal 200. For example, the environmental evaluation unit 131 may evaluate whether textbooks, writing utensils, etc. are prepared at the desk, whether there are other objects that interfere with studying (e.g., portable game consoles, toys, etc.) placed on the desk, whether the lighting in the study environment is appropriate, etc. from the captured video based on AI, and for such AI learning and evaluation, reference videos (or images) of textbooks, tablets, etc., reference videos (or images) of lighting illuminance, related image data, etc. may be stored in the storage unit 180.

The attitude evaluation unit 132 may evaluate the studying attitude of the student using AI on the basis of video information during the registered study time. For example, the attitude evaluation unit 132 may evaluate the studying attitude of the student by comprehensively determining whether the student is absent (or leaves) during the study time, whether the student is dozing face down, whether the student adopts a contorted posture, etc., and for the AI learning and evaluation, reference information such as reference videos and images, reference values, etc. for various situations that students may face during the study time, such as sitting, absence (or leaving), drowsiness, etc. may be additionally stored in the storage unit 180.

Here, in order to immediately meet the needs of students who want to study beyond the pre-input study time, even during study or before starting study, the video-learning monitoring application according to another embodiment of the present invention may reflect the study time and monitor learning by increasing the time in the pre-registered study schedule of the student when the student studies beyond the study time. Therefore, the student may increase his/her study time at any time before or during study, the parent terminal 300 may also be notified in real time of such a request to increase study time, and the attitude evaluation unit 132 and the score calculation unit 140 may consider the request to increase study time received from the user terminal 200 as a positive factor in evaluating the attitude and calculating the self-directed learning score.

Similarly, an interface that allows the student to request a break in study during study time may be further provided in the video-learning monitoring application, and when a situation arises where the student should inevitably stop studying during study time, the control unit 110 may be configured to add the remaining time resulting from study interruption to a future study time (e.g., the next day or a date input by the student) or to register a separate study time in the schedule and set and store the study time in the schedule to perform additional study according to the time registered in the schedule.

When the evaluation evaluated by the evaluation unit 130, more specifically, the evaluation of the study environment evaluated by the environmental evaluation unit 131 and the evaluation of the studying attitude evaluated by the attitude evaluation unit 132 are completed, the score calculation unit 140 of the video-learning monitoring device 100 according to the embodiment of the present invention may calculate the self-directed learning score on the basis of at least one of the environmental evaluation and the attitude evaluation evaluated by the evaluation unit 130. For example, the self-directed learning score may be set at a perfect score of 100, the score may be given as a specific numerical value by comprehensively evaluating timely access, a study environment before starting study, a study preparation situation, a studying attitude during study time, etc., and the scoring of the environment and attitude of such self-directed learning may be automatically implemented using AI-based learning.

Here, when the study time registered by the user terminal 200 exceeds 1 hour, that is, when the student registers the study time in excess of 1 hour, the video-learning monitoring device 100 according to another embodiment of the present invention may set the middle of the study time, for example, approximately the middle time of the study time, as a break time to inform the user terminal 200 and/or the parent terminal 300 of the set break time. The set break time may be approximately 10 to 20 minutes, and the video-learning monitoring system 1000 may be implemented so that the evaluation of studying attitude evaluated by the attitude evaluation unit 132 and the calculation of the self-directed learning score calculated by the score calculation unit 140 are not performed during the informed break time. Here, a maximum study time per day (e.g., 4 hours or the like) that the user terminal 200 can register may be preset, and the study time input in excess of the set maximum study time may be modified to the value of the set maximum study time and returned to the user terminal 200 and/or the parent terminal 300.

For reference, the self-directed learning score calculated by the score calculation unit 140 may be implemented as a score based on the environmental evaluation and a score based on the attitude evaluation or may be implemented as a single score calculated by combining the score based on the environmental evaluation and the score based on the attitude evaluation (e.g., a score calculated by averaging the two items, a score calculated by applying different weights to the two items, etc.), but the method of evaluating the self-directed learning score according to the embodiment of the present invention is not limited thereto.

Further, the feedback unit 150 of the video-learning monitoring device 100 may provide feedback to the user terminal 200 in real time based on AI during the registered study time. For example, the feedback unit 150 may analyze the captured video information received from the user terminal 200 based on AI to provide appropriate feedback to the user terminal 200 for a situation in which the student is unable to concentrate on studying and is dozing off, a situation in which the student is absent from his/her desk and the absence exceeds a preset time (e.g., 3 minutes), etc. For example, the feedback provided to the user terminal 200 may be implemented as voice (or sound/notification), may be implemented as text, may be implemented as a video, or may be implemented as a combination of voice/text/video, etc. Of course, when the student complies with the self-directed learning, the feedback unit 150 may actively encourage the student's interest in good study habits by providing positive feedback.

The evaluation operations by the environmental evaluation unit 131 and the attitude evaluation unit 132 described above or the feedback provision operation by the feedback unit 150 may be implemented using AI on the basis of video information analysis. Here, an operator (who may also be referred to as a "master," "tutor," etc.) of the video-learning monitoring device 100 may assist with the evaluation operation by the evaluation unit 130 or the feedback operation by the feedback unit 150.

According to the video-learning monitoring system 1000 as exemplarily illustrated in FIG. 1A, a single user terminal 200 may access the video-learning monitoring device 100 and receive the video-learning monitoring service, and an interface through which such a one-to-one learning monitoring video is displayed on the video-learning monitoring device 100 is exemplarily illustrated in FIG. 2B. As illustrated in FIG. 2B, the video-learning monitoring device 100 monitors only the studying video received from the single user terminal 200 on a one-to-one basis, and thus it is possible to perform more focused and specialized learning monitoring and online learning guidance.

In addition, according to the video-learning monitoring system 1000 as exemplarily illustrated in FIG. 1B, a plurality of user terminals 200-1, 200-2, . . . , and 200-N (here, N is a natural number of 2 or more) may access the video-learning monitoring device 100 and receive the video-learning monitoring service, and an interface through which such one-to-many learning monitoring videos are displayed on the video-learning monitoring device 100 is exemplarily illustrated in FIG. 2C.

In the example of FIG. 2C, the feedback unit 150 may be configured to perform one-to-one communication (e.g., conversation, chat, etc.) with only one user terminal 200 selected from among the plurality of user terminals 200 that have accessed the video-learning monitoring device 100, the content of the one-to-one communication may not be transmitted to the remaining user terminals 200 that are not selected, and therefore it is possible to provide targeted or customized feedback to a specific student or specified students even in a one-to-many learning monitoring environment. For example, the one-to-one customized feedback provided to the user terminal 200 may at least include content related to online learning guidance.

In addition, the feedback unit 150 according to another embodiment of the present invention may be configured to simultaneously communicate with all of the plurality of user terminals 200 (e.g., for overall notification), and to this end, a mode switching interface that allows switching between a one-to-one communication mode and a one-to-many communication mode may be additionally provided in the video-learning monitoring device 100.

For reference, as illustrated in FIGS. 1B and 2C, when the plurality of user terminals 200 simultaneously access the video-learning monitoring device 100 and receive the video-learning monitoring service, only their own videos may be displayed on a display of each of the plurality of user terminals 200 or a video of at least one other student may also be displayed. To this end, an interface that allows selection of a non-display mode of other student studying videos and a display mode of other student studying videos may be provided on the user terminal 200 through the video-learning monitoring application, and therefore each student may select whether to display videos of other students currently studying at the same time as him/her, depending on his/her preference.

In particular, in the latter case, by displaying the studying videos of other students studying at the same time on the user terminal 200, not only may the student visually check learning attitudes of other students, but the student's motivation for self-directed study can also be further stimulated. Here, other students displayed together on the user terminal 200 may be some students randomly selected from among a plurality of students who have accessed the video-learning monitoring device 100 at the same time, or may be students grouped based on the user's age (grade)/sex/region/school/score, or some thereof.

In relation to the calculation of self-directed learning score by the score calculation unit 140 according to the embodiment of the present invention, a reference score (e.g., 50 or the like) for customized online/offline linked guidance may be preset. For example, when the self-directed learning score calculated by the score calculation unit 140 is less than the reference score or is less than the average of the self-directed learning score over a certain period of time (for example, one week or the like), the matching unit 160 according to the embodiment of the present invention may match a tutor who can provide customized online/offline linked guidance to the student, or the control unit 110 may grant an additional (or supplemental) study time to provide the additional (or supplemental) study time to the user terminal 200 and/or the parent terminal 300 by referring to the schedule of the corresponding student, and thus additional time may be provided to improve the self-directed learning ability of the student.

The matching unit 160 may perform customized matching of a student and a tutor on the basis of information about students, information about registered tutors, etc. stored in the storage unit 180, and the matching information may be provided to, for example, the user terminal 200, the parent terminal 300, the tutor terminal 400 (see FIG. 4), etc. For reference, the tutor terminal 400 may be communicatively coupled to the video-learning monitoring device 100 according to the embodiment of the present invention, and in this specification below, the term "tutor" may refer to a teacher who is specialized in providing guidance on specific subjects as well as self-directed learning not only online but also offline, that is, face-to-face with students.

The communication unit 170 may be configured to communicate with the user terminal 200, the parent terminal 300, the tutor terminal 400, the payment server (not illustrated), etc. For example, the self-directed learning score of the student calculated by the score calculation unit 140 may be transmitted to at least one of the user terminal 200 of the corresponding student and the parent terminal 300 of the corresponding student through the communication unit 170, and information on the student-tutor matching performed by the matching unit 160 for the student with a score below the reference score may be transmitted to at least one of the user terminal 200 of the corresponding student, the parent terminal of the corresponding student, and the tutor terminal 400 of the matching teacher through the communication unit 170.

For reference, the communication unit 170 is provided for direct connection to the outside or for connection through a network, and may be a wired and/or wireless communication unit 170. Specifically, the communication unit 170 may transmit data to the control unit 110, the input unit 120, the evaluation unit 130, the score calculation unit 140, the feedback unit 150, the matching unit 160, the notification unit 190, etc. in a wired or wireless manner, or may receive data from the outside in a wired or wireless manner to transmit the data to the control unit 110, the input unit 120, the evaluation unit 130, the score calculation unit 140, the feedback unit 150, the matching unit 160, and the notification unit 190 or store it in the storage unit 180. The data may include content such as text, an image, a video, etc.

The communication unit 170 may communicate through a local area network (LAN), Wideband Code Division Multiple Access (WCDMA), Long-Term Evolution (LTE), wireless broadband Internet (WiBro), radio frequency (RF) communication, a wireless LAN, wireless fidelity (Wi-Fi), near-field communication (NFC), Bluetooth, infrared communication, etc. However, this is an example, and various wired and wireless communication technologies applicable in the technical field may be used according to the embodiment to which the present invention is applied.

The storage unit 180 may store arbitrary data related to the video-learning monitoring device 100, the video-learning monitoring system 1000, and the video-learning monitoring service according to the embodiment of the present invention. For example, the data stored in the storage unit 180 may include data for the video-learning monitoring application, data for the user information, data for the registered study time, data for the captured studying video, data for the environmental evaluation result, data for the attitude evaluation result, data for the self-directed learning score, data for the AI algorithm for real-time feedback coaching, data for the student-tutor matching, etc., but the present invention is not limited thereto.

For reference, as known to those skilled in the art, the storage unit 180 may be implemented as various types of storage devices capable of inputting and outputting information, such as a hard disk drive (HDD), a read-only memory (ROM), a random access memory (RAM), an electrically erasable and programmable ROM (EEPROM), a flash memory, a compact flash (CF) card, a secure digital (SD) card, a smart media (SM) card, a multimedia card (MMC), a memory stick, etc., or may be provided inside the video-learning monitoring device 100 as illustrated in FIG. 1 or installed in a separate external device. Alternatively, the storage unit 180 may be replaced with a web storage that performs a storage function on the Internet.

In addition, although not explicitly illustrated in the block diagram of FIG. 1, the video-learning monitoring device 100 according to the embodiment of the present invention may further include a display unit (not illustrated), and for example, the captured video of the student may be displayed through the display unit, as illustrated in FIGS. 2B and 2C. The display unit may display various pieces of information processed by the video-learning monitoring device 100 through a display device, and here, the display device may include at least one of a liquid crystal display (LCD), a thin film transistor-liquid crystal display (TFT LCD), an organic light-emitting diode (OLED), a flexible display, and a three-dimensional (3D) display.

The notification unit 190 may provide various types of notifications to the user terminal 200. For example, for the user terminal 200 on which the user has registered 10:00-11:00 PM as a study time, the notification unit 190 may provide a predetermined notification to the user terminal 200 in advance (e.g., at 9:50 PM or the like) and additionally provide the predetermined notification to the parent terminal 300 in advance, and accordingly, the convenience and satisfaction of users who receive the video-learning monitoring service can be significantly improved.

The control unit 110 may generally control the operation of the video-learning monitoring device 100 according to the embodiment of the present invention. For example, the control unit 110 may be implemented as a processor, a controller, a micro-processor, a micro controller, or the like. That is, the control unit 110 may operate a combination of one or more of the components included in the video-learning monitoring device 100 in order to execute the application program.

The user terminal 200 may be communicatively coupled to the video-learning monitoring device 100. As described above, a one-to-one learning monitoring environment may be established as illustrated in FIGS. 1A and 2B or a one-to-many learning monitoring environment may be established as illustrated in FIGS. 1B and 2C. In this specification, although the user of the user terminal 200 is representatively described as a student who wants to improve his or her self-directed learning ability, an ordinary person who wishes to develop a self-directed attitude or posture may of course also be a user of the user terminal 200.

Further, in this specification, although the service for monitoring the user's self-study by the video-learning monitoring device 100 is representatively described, it will be clear that various activities that enable developing self-directed lifestyle habits, such as reading, writing, foreign language conversation, home training, cooking, and hobbies, in addition to studying may also be applied to the video-learning monitoring device 100 and the video-learning monitoring system 1000, and various types of content to also support services for these various activities may also be stored in the storage unit 180.

For reference, the user terminal 200 may be referred to as a subscriber unit, a subscriber station, a mobile station, a mobile terminal, a remote station, a remote terminal, a mobile device, an access terminal, a terminal, a wireless communication device, a user agent, a user device, or user equipment (UE). The access terminal may be a cellular phone, a cordless phone, a Session Initiation Protocol (SIP) phone, a wireless local loop (WLL) station, a personal digital assistant (PDA), a handheld device with a wireless connectivity capability, a computing device, or another processing device connected to a wireless modem.

Figure 3:
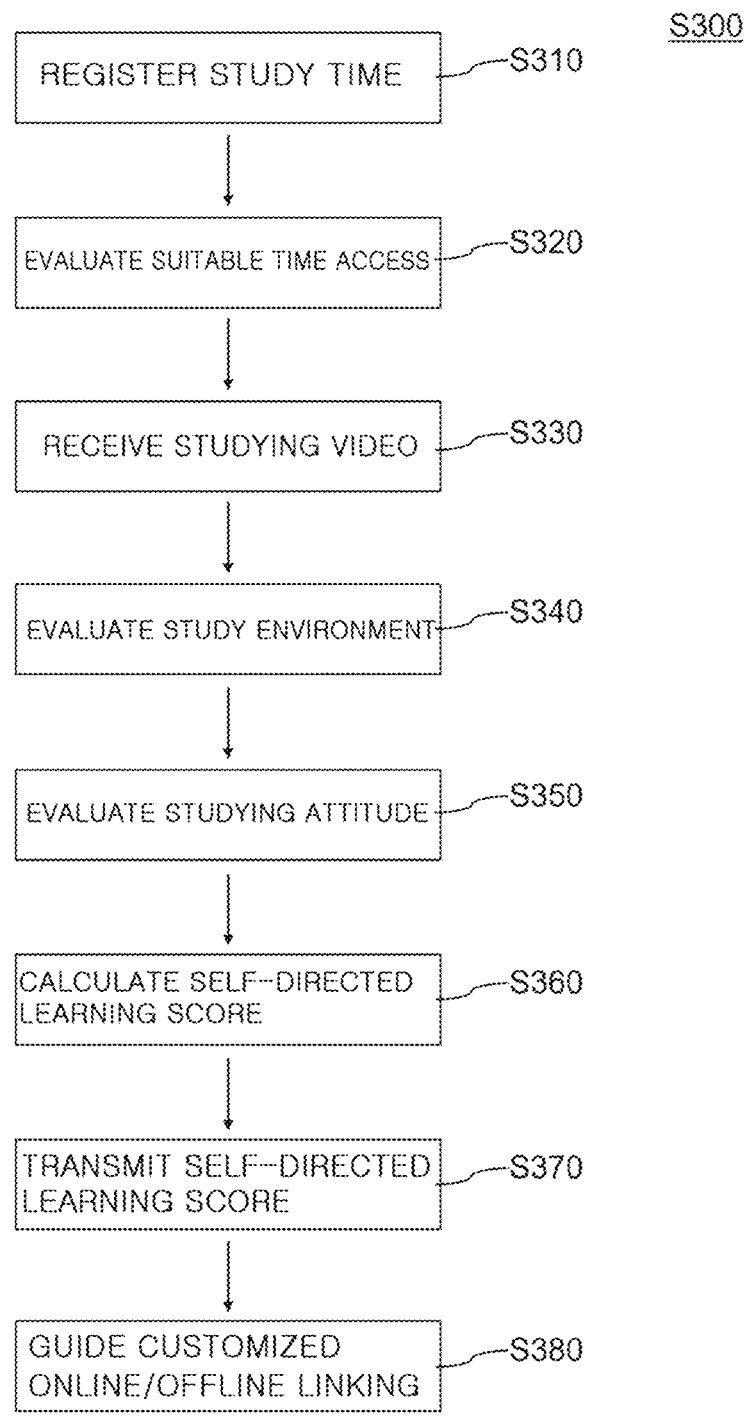
FIG. 3 is a flowchart for describing a video-learning monitoring method (S300) according to an embodiment of the present invention.

FIG. 3 is a flowchart for describing a video-learning monitoring method S300 according to an embodiment of the present invention.

First, the user terminal 200, on which a video-learning monitoring application is downloaded through an online market or the like and installed, may register a study time through the input unit 120 (S310). The study time registered through the input unit 120 may be stored in the storage unit 180, and may be used in evaluation by the evaluation unit 130, calculation of self-directed learning scores by the score calculation unit 140, and notifications by the notification unit 190.

When the study time of the student (e.g., 10:00-11:00 PM) is input through the input unit 120, the environmental evaluation unit 131 of the evaluation unit 130 may determine whether the corresponding user terminal 200 has performed timely access (S320). As described above, the evaluation acts as a positive factor in the self-directed learning scores for students who are determined to have performed timely access, and acts as a negative factor in the self-directed learning scores for students who are not determined to have performed timely access.

When it is determined that the student has performed timely access and the registered study time approaches, the studying video of the student that is captured by the user terminal 200 may be received in real time through the communication unit 170 (S330). As described above, in a one-to-one learning monitoring environment, the studying video of the student may be displayed on the video-learning monitoring device 100 as illustrated in FIG. 2B, while, in a one-to-many learning monitoring environment, a plurality of studying videos may be displayed on the video-learning monitoring device 100 as illustrated in FIG. 2C, and a display mode may be selected so that studying videos of other students may be displayed together or may not be displayed on the user terminal 200.

The environmental evaluation unit 131 may evaluate a study environment (S340), the attitude evaluation unit 132 may evaluate a studying attitude (S350), and the score calculation unit 140 may calculate a self-directed learning score on the basis of an evaluation result of the study environment evaluated by the environmental evaluation unit 131 and/or an evaluation result of the studying attitude evaluated by the attitude evaluation unit 132 (S360).

When the self-directed learning score is calculated, the communication unit 170 may transmit the calculated self-directed learning score to at least one of the user terminal 200 and the parent terminal 300 (S370), and the matching unit 160 may perform student-tutor matching for students with self-directed learning scores below a reference score to provide customized online/offline linked guidance (S380). For reference, the video-learning monitoring system 1000 according to the embodiment of the present invention may be additionally equipped with regional education locations for offline linked guidance, and may assist the matching student and tutor to meet at the corresponding education location and perform offline learning guidance.

In addition, according to another embodiment of the present invention, predetermined rewards may be provided to students with excellent self-directed learning scores. For example, the rewards provided to excellent students may include discounts/exemption of service usage fees, point accumulation, etc., but the present invention is not limited thereto.

In addition to transmitting the calculated self-directed learning scores to the user terminal 200 and/or parent terminal 300, the video-learning monitoring device 100 according to another embodiment of the present invention may additionally transmit specific matters related to matters such as the environmental evaluation results and attitude evaluation results evaluated by the evaluation unit 130, and the online learning guidance provided by the feedback unit 150, to the user terminal 200 and/or the parent terminal 300.

Figure 4:
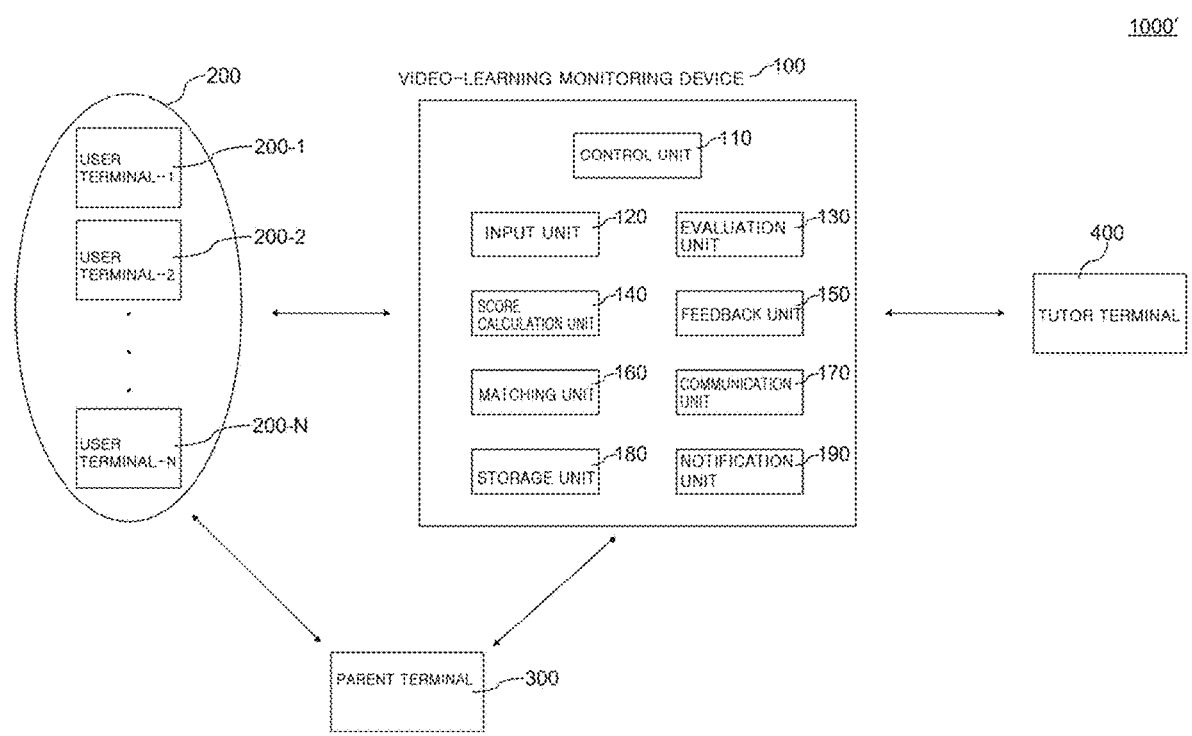
FIG. 4 is a schematic block diagram of a video-learning monitoring system (1000') according to another embodiment of the present invention.

FIG. 4 is a schematic block diagram of a video-learning monitoring system 1000' according to another embodiment of the present invention.

As described above, the self-directed learning score calculated by the score calculation unit 140 of the video-learning monitoring device 100 according to the embodiment of the present invention may be transmitted to the parent terminal 300 through the communication unit 170, and to this end, the video-learning monitoring system 1000' according to another embodiment of the present invention may further include a parent terminal 300 that is communicatively coupled to the video-learning monitoring device 100 and the user terminal 200.

Further, the matching unit 160 of the video-learning monitoring device 100 according to the embodiment of the present invention may perform student-tutor matching for students with self-directed learning scores below the reference score, thereby providing customized online/offline services, and to this end, the video-learning monitoring system 1000' according to another embodiment of the present invention may further include a tutor terminal 400 that is communicatively coupled to the video-learning monitoring device 100.

For reference, the parent terminal 300 and the tutor terminal 400 may be referred to as a subscriber unit, a subscriber station, a mobile station, a mobile terminal, a remote station, a remote terminal, a mobile device, an access terminal, a terminal, a wireless communication device, a user agent, a user device, or UE. Although FIG. 4 exemplarily illustrates a single parent terminal 300 and a single tutor terminal 400, it will be clear that a plurality of parent terminals 300 and a plurality of tutor terminals 400 may be provided.

As described above, according to the video-learning monitoring device and method according to an embodiment of the present invention, it is possible to improve self-directed learning capabilities of students' through video-learning monitoring and evaluation.

Further, according to the video-learning monitoring device and method according to an embodiment of the present invention, it is possible to improve continuous learning attitudes and academic abilities of students by utilizing self-directed learning scores calculated based on studying videos of the students.

Further, according to the video-learning monitoring device and method according to an embodiment of the present invention, it is possible to help students develop study habits and to improve self-directed learning abilities by providing the students with relatively low self-directed learning abilities with online learning guidance and customized online/offline linked guidance services.

Further, according to the video-learning monitoring device and method according to an embodiment of the present invention, it is possible to increase students' interest in an online self-directed learning management system by providing predetermined rewards to the students with excellent evaluation results from video learning monitoring.

Meanwhile, various embodiments described in this specification may be implemented by hardware, middleware, microcode, software, and/or a combination thereof. For example, various embodiments may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions presented herein, or combinations thereof.

Further, for example, various embodiments may be encoded or embodied in computer-readable media containing instructions. The instructions contained or encoded in the computer-readable media may cause a programmable processor or other processor to perform a method, for example, when the instructions are executed. The computer-readable media may include computer storage media, which may be any available media that a computer can access. For example, such computer-readable media may include a RAM, a ROM, an EEPROM, a compact disc read only memory (CD-ROM), other optical disc storage media, magnetic disk storage media, or other magnetic storage devices.

Such hardware, software, firmware, etc. may be implemented within the same device or within individual devices to support the various operations and functions described herein. In addition, components, units, modules, components, etc. described as "unit" or "part" in the present invention may be implemented together or individually as separate but interoperable logic devices. The description of different features for modules, units, etc. is intended to highlight different functional embodiments and does not necessarily imply that they should be realized by individual hardware or software components. Rather, functionality associated with one or more modules or units may be performed by separate hardware or software components or may be integrated within common or separate hardware or software components.

While operations are illustrated in the accompanying drawings in a particular order, it should not be understood that these operations should be performed in the illustrated specific order or sequence or that all illustrated operations should be performed in order to obtain a desired result. In a particular case, multi-tasking and parallel processing may be advantageous. Separation of various components in the above-described embodiments should not be understood to be required for all the embodiments. In general, it should be understood that the described components may be integrated in a single software product or may be packed in multiple software products.

Optimal embodiments have been disclosed above with reference to the accompanying drawings and specifications. Although specific terms are used here, these terms are used only for the purpose of explaining the present invention and are not used to limit the meaning or scope of the present invention described in the claims. Therefore, it should be understood by those of ordinary skill in the art that various alterations and equivalent other embodiments may be made. Therefore, the scope of the present invention should be defined by only the following claims.

100: VIDEO-LEARNING MONITORING DEVICE
110: CONTROL UNIT
120: INPUT UNIT
130: EVALUATION UNIT
131: ENVIRONMENTAL EVALUATION UNIT
132: ATTITUDE EVALUATION UNIT
140: SCORE CALCULATION UNIT
150: FEEDBACK UNIT
160: MATCHING UNIT
170: COMMUNICATION UNIT
180: STORAGE UNIT
190: NOTIFICATION UNIT
200: USER TERMINAL
300: PARENT TERMINAL
400: TUTOR TERMINAL
1000, 1000': VIDEO-LEARNING MONITORING SYSTEM

The invention claimed is:

1. A video-learning monitoring system (1000) comprising:
a video-learning monitoring device (100); and
a user terminal (200) communicatively coupled to the video-learning monitoring device (100),
wherein the video-learning monitoring device (100) includes:
a communication unit (170) configured to receive a studying video of a student that is captured by the user terminal (200) when a study time input by the user terminal (200) arrives and a video-learning monitoring application is executed on the user terminal (200);
a score calculation unit (140) configured to calculate a self-directed learning score of the student based on the studying video received by the communication unit (170) and the study time input by the user terminal (200); and
an evaluation unit (130) including an environmental evaluation unit (131) for evaluating the student's study environment and an attitude evaluation unit (132) for evaluating the student's study attitude,
wherein the environmental evaluation unit (131) is configured to evaluate whether or not there is a timely connection for the input study time based on communication connection information from the user terminal (200) to the video-learning monitoring device (100),
wherein the attitude evaluation unit (132) is configured to use an AI learning model by inputting the studying video to
analyze whether the student is seated, showing signs of drowsiness, absent, prone, and any changes in posture, and
evaluate the student's study attitude during the study time and the student's attitude beyond the input study time based on the analysis result, the beyond the input study time being defined as during a continuous, uninterrupted extension session that begins immediately after expiration of the input study time while the user terminal (200) remains connected to the video-learning device (100),
wherein the user terminal (200) is provided with an input interface for inputting the study time and a predetermined notification regarding the input study time,
wherein the communication unit (170) is further configured to transmit the calculated self-directed learning score to the parent terminal (300) or the user terminal (200),
wherein, in response to a plurality of user terminals (200) simultaneously accessing the video-learning monitoring device (100) and receiving the video-learning monitoring service, only a studying video of a respective student is displayed on a display of each of the plurality of user terminals (200) or a studying video of at least one other student is displayed,
wherein a feedback unit (150) of the video-learning monitoring device (100) is configured to perform one-to-one communication with one user terminal (200) selected from among the plurality of user terminals (200) that have accessed the video-learning monitoring device (100), wherein a content of the one-to-one communication is not transmitted to a remaining of the user terminals (200) that is not selected, thereby providing targeted or customized feedback to a specific student or specified students in a one-to-many learning monitoring environment, wherein the feedback unit (150) is configured to simultaneously communicate with all of the plurality of user terminals (200), and a mode switching interface is configured to allow switching between a one-to-one communication mode and a one-to-many communication mode provided in the video-learning monitoring device (100).

2. The video-learning monitoring system (1000) of claim 1, wherein the score calculation unit (140) is further configured to calculate the self-directed learning score using at least one of the evaluation results from the environmental evaluation unit (131) and the evaluation results from the attitude evaluation unit (132).

3. A video-learning monitoring method in a video-learning monitoring device, comprising:

when a study time input by a user terminal (200) arrives and a video-learning monitoring application is executed on the user terminal, receiving, by a communication unit of the video-learning monitoring device (100), a studying video of a student captured by the user terminal;

evaluating, by an evaluation unit (130) of the video-learning monitoring device, a study environment of the student and a study attitude of the student;

calculating, by a score calculation unit (140), a self-directed learning score of the student based on the received studying video and the study time input by the user terminal; and transmitting, by the communication unit (170), the calculated self-directed learning score to a parent terminal (300) or the user terminal, wherein evaluating the student's study environment includes outputting, as an evaluation result, whether or not there is a timely connection at the input study time based on communication connection information from the user terminal (200) to the video-learning a device (100), wherein evaluating the student's study attitude includes using an AI learning model by inputting the studying video to analyze whether the student is seated, showing signs of drowsiness, absent, prone, and any changes in posture, and evaluate the student's study attitude during the study time and the student's attitude beyond the input study time based on the analysis result, the beyond the input study time being defined as during a continuous, uninterrupted extension session that begins immediately after expiration of the input study time while the user terminal (200) remains connected to the video-learning monitoring device (100), wherein the user terminal is provided with an input interface for inputting the study time and a predetermined notification regarding the input study time, wherein, in response to a plurality of user terminals (200) simultaneously accessing the video-learning monitoring device (100) and receiving the video-learning monitoring service, only a studying video of a respective student is displayed on a display of each of the plurality of user terminals (200) or a studying video of at least one other student is displayed, wherein a feedback unit (150) of the video-learning monitoring device (100) is configured to perform one-to-one communication with one user terminal (200) selected from among the plurality of user terminals (200) that have accessed the video-learning monitoring device (100), wherein a content of the one-to-one communication is not transmitted to a remaining of the user terminals (200) that is not selected, thereby providing targeted or customized feedback to a specific student or specified students in a one-to-many learning monitoring environment, wherein the feedback unit (150) is configured to simultaneously communicate with all of the plurality of user terminals (200), wherein a mode switching interface is configured to allow switching between a one-to-one communication mode and a one-to-many communication mode provided in the video-learning monitoring device (100).

4. The video-learning monitoring method of claim 3, wherein the step of calculating the self-directed learning score of the student includes calculating the self-directed learning score using at least one of the evaluation result of the study environment and the evaluation result of the study attitude as obtained from the evaluation unit.

* * * * *